United States Patent [19]

Roessler

[11] Patent Number: 5,211,509
[45] Date of Patent: May 18, 1993

[54] EXTRACTION OF UNDERGROUND PIPE

[76] Inventor: Klaus E. Roessler, 2 Waterhouse Bay, Winnipeg, Manitoba, Canada, R3R 2N4

[21] Appl. No.: 740,098

[22] Filed: Aug. 5, 1991

[51] Int. Cl.⁵ .............................................. F16L 1/028
[52] U.S. Cl. .................................... 405/184; 405/154; 254/29 R
[58] Field of Search ............. 405/154, 184; 254/29 R; 138/97

[56] References Cited

U.S. PATENT DOCUMENTS

| | | |
|---|---|---|
| 2,297,164 | 9/1942 | Rainwater .......................... 254/29 R |
| 3,907,253 | 9/1975 | Schosek .............................. 254/29 R |
| 4,626,134 | 12/1986 | Coumont ............................... 405/184 |
| 4,637,756 | 1/1987 | Boles ..................................... 405/184 |
| 5,013,188 | 5/1991 | Campbell et al. ................... 405/184 |

Primary Examiner—Randolph A. Reese
Assistant Examiner—Arlen L. Olsen
Attorney, Agent, or Firm—Adrian D. Battison; Murray E. Thrift; Stanley G. Ade

[57] ABSTRACT

Underground pipe is withdrawn in a continuous pipe portion without excavating the full length of the pipe by positioning in an opening at one end of the pipe portion a boom mounted on a vehicle. The boom carries a lower reaction member which projects forwardly from a rear end of the opening into contact with a brace at the front face of the opening. A winch mounted on the vehicle operates on a cable passing over pulleys carried on the boom including a pulley at the lowermost end of the boom at the rear end of the reaction member. The cable is passed through the pipe portion to an abutment member on the far end so the whole of the pipe portion can be pulled in one action. The abutment member can carry a plug or guide for a replacement pipe portion.

12 Claims, 4 Drawing Sheets

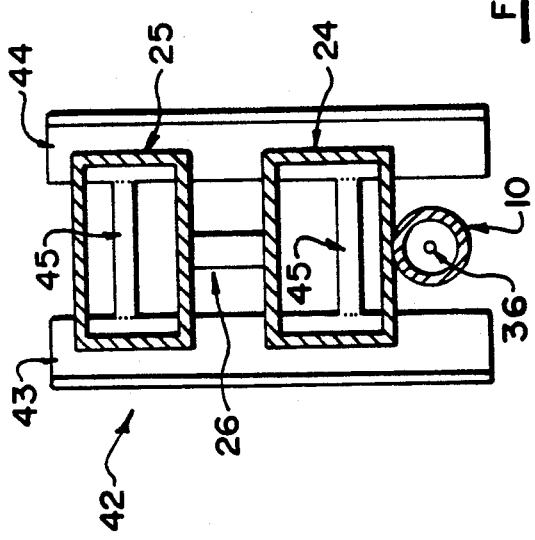
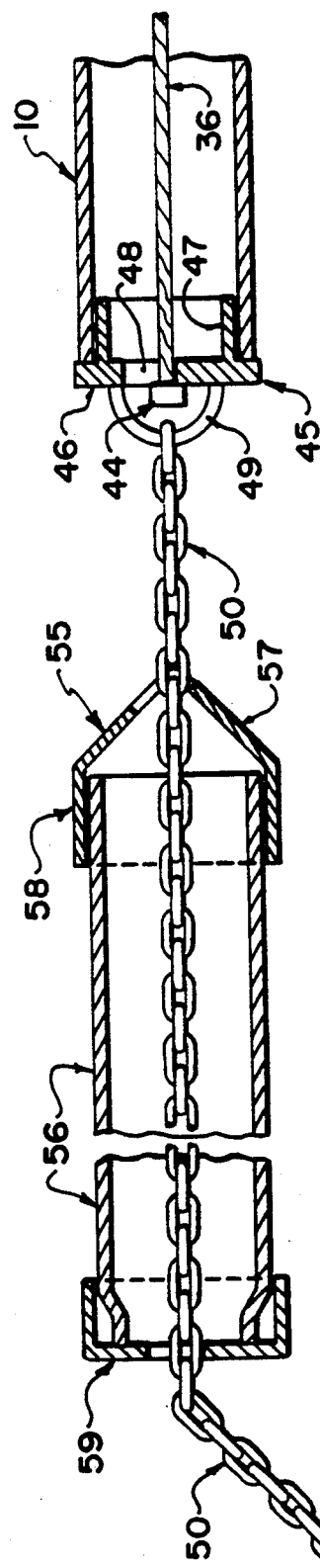

EXTRACTION OF UNDERGROUND PIPE

BACKGROUND OF THE INVENTION

This invention relates to a method and apparatus for extraction of underground pipe by a technique which involves pulling a portion of the pipe into an opening formed in the ground at one end of the portion without the necessity for excavating along the full length of the pipe portion.

The replacement of existing underground pipe is becoming more important now that the pipes are becoming old with the danger of breakage and leaking. It is well known that in many situations it is highly desirable to be able to remove the pipe without the necessity for excavating along the full length of the pipe particularly where the pipe crosses busy highways, rail lines or other obstacles. However the desirability of carrying out this step is known, up till now no suitable apparatus or method has been available to enable this to be carried out. This is particularly because the amount of force involved in pulling a significant length of the pipe from the ground is extremely high and no practical technique for generating this significant level of force has up till now been available.

Less satisfactory techniques have therefore involved pulling a wedge along the pipe which forces the pipe outwardly breaking it into pieces which is then forced radially outwardly into the ground surrounding the position of the original pipe. A replacement pipe can then be pulled longitudinally through the opening thus formed. This technique involves significantly less force and is thus readily available but is in many cases impractical since the broken pieces of the pipe generally of cast iron or steel are very sharp and can then penetrate the replacement pipe as the ground resettles.

Another technique shown in U.S. Pat. No. 4,626,134 (Coumont) attempts to pull the pipe by a hydraulic ram arrangement which is inserted into the pipe from one end and then acts to grasp an end of a pipe section and pull it into the opening where the ram is located. This device has achieved little success in view of the fact that it is highly inefficient to pull the pipe one section at a time and in view of the fact that the hydraulic ram in many cases cannot generate enough force to provide the pulling action. The technique is also limited to relatively small pipes.

SUMMARY OF THE INVENTION

It is one object of the present invention, therefore, to provide an improved method and apparatus for removing underground pipe.

According to a first aspect of the invention, therefore, there is provided a method for extracting underground pipe comprising excavating a first and a second opening in the ground to expose a first and a second end of a portion of the pipe, passing a cable through the pipe from the first end to the second end, attaching an abutment member to the cable at the second end so as to engage the second end of the pipe portion, winding the cable onto a winch mounted at the first opening, guiding the cable at the first opening so as to apply a longitudinal pulling force on the pipe portion to pull the pipe portion into the first opening and engaging a side of the opening adjacent the first end to apply a reaction from the pulling force to the ground surrounding the pipe.

According to a second aspect of the invention, therefore, there is provided an apparatus for extracting underground pipe comprising a vehicle having means for moving along the ground, a boom mounted on the vehicle for movement relative to the vehicle for insertion of an end of the boom into an opening in the ground, a winch mounted on the vehicle for winding and releasing a cable, a boom having a lower portion thereof arranged at the lower end thereof so as to extend substantially longitudinally of the opening in a substantially horizontal direction from a forward end thereof to a rearward end, a cable guide member mounted on the rearward end of the boom portion, means guiding the cable from the cable guiding member to the winch, means at a forward end of the boom for providing a reaction force against the ground at one side of the opening and abutment means on a remote end of the cable for engaging a remote end of a pipe portion.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 2 is a part cross sectional view along the lines 2—2 of FIG. 1.

FIG. 3 is a cross sectional view through a rear end of the pipe portion together with a front section of a replacement pipe portion for insertion into the underground location.

In the drawings like characters of reference indicate corresponding parts in the different figures.

DETAILED DESCRIPTION

A portion of underground pipe in indicated at 10 buried within an overburden 11 and located between a first opening 12 in the ground and a second opening 13. The overburden in the area between the openings 12 and 13 can be at an obstruction for example a busy road intersection where it is highly undesirable to excavate the whole of the length of the pipe between the openings so that it is necessary for the pipe to be extracted by pulling the pipe directly from the underground location in an axial direction to remove the pipe for replacement. The distance between the opening 12 and 13 is not shown to scale but in practice can be as much as 100 to 150 feet which is certainly sufficient to accommodate the average obstacle such as roadways, rail lines, landscaping, etc.

Figure 1:
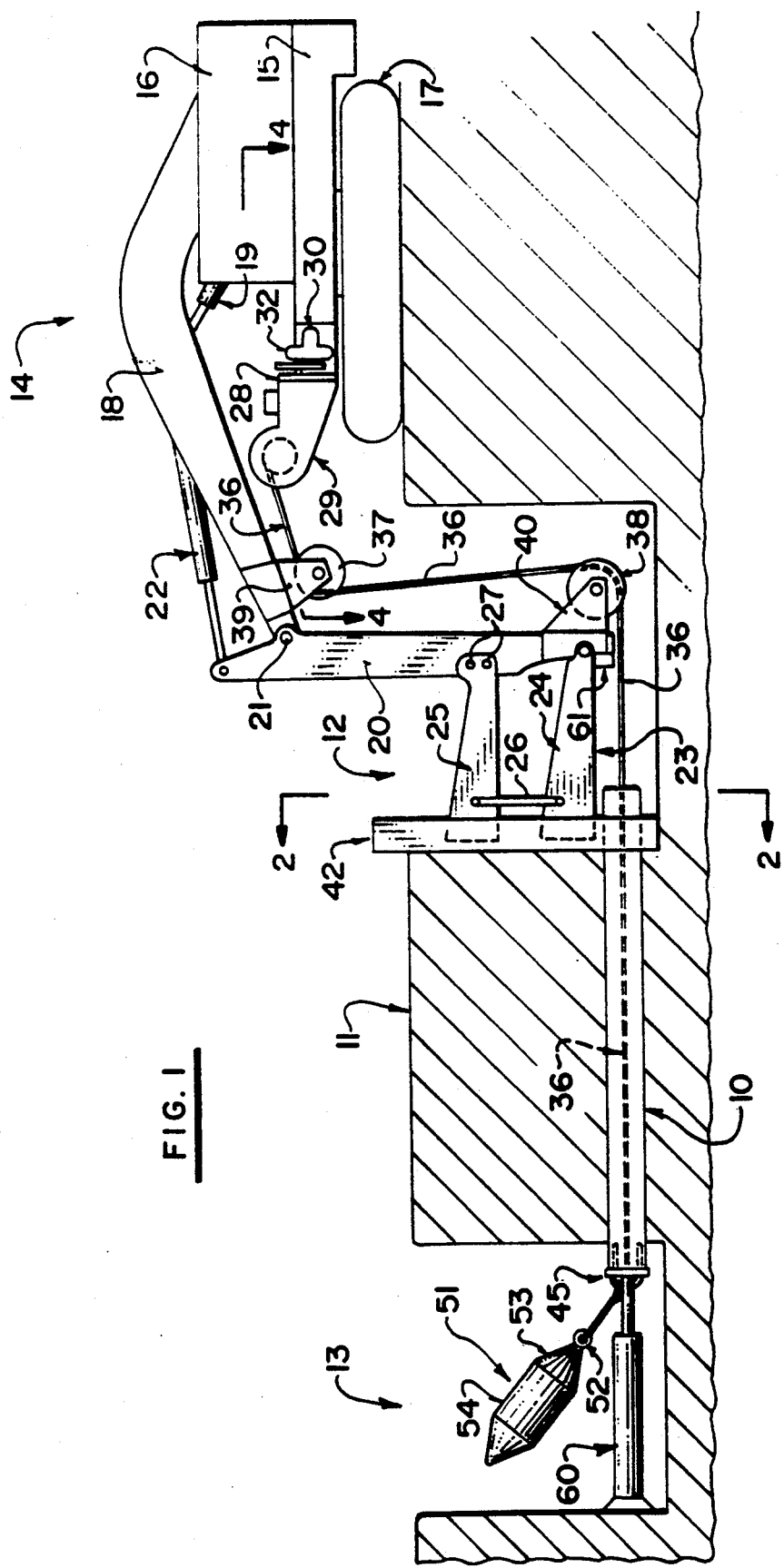
FIG. 1 is a schmatic side elevational view of an apparatus and system for extracting underground pipe.
Figure 4:
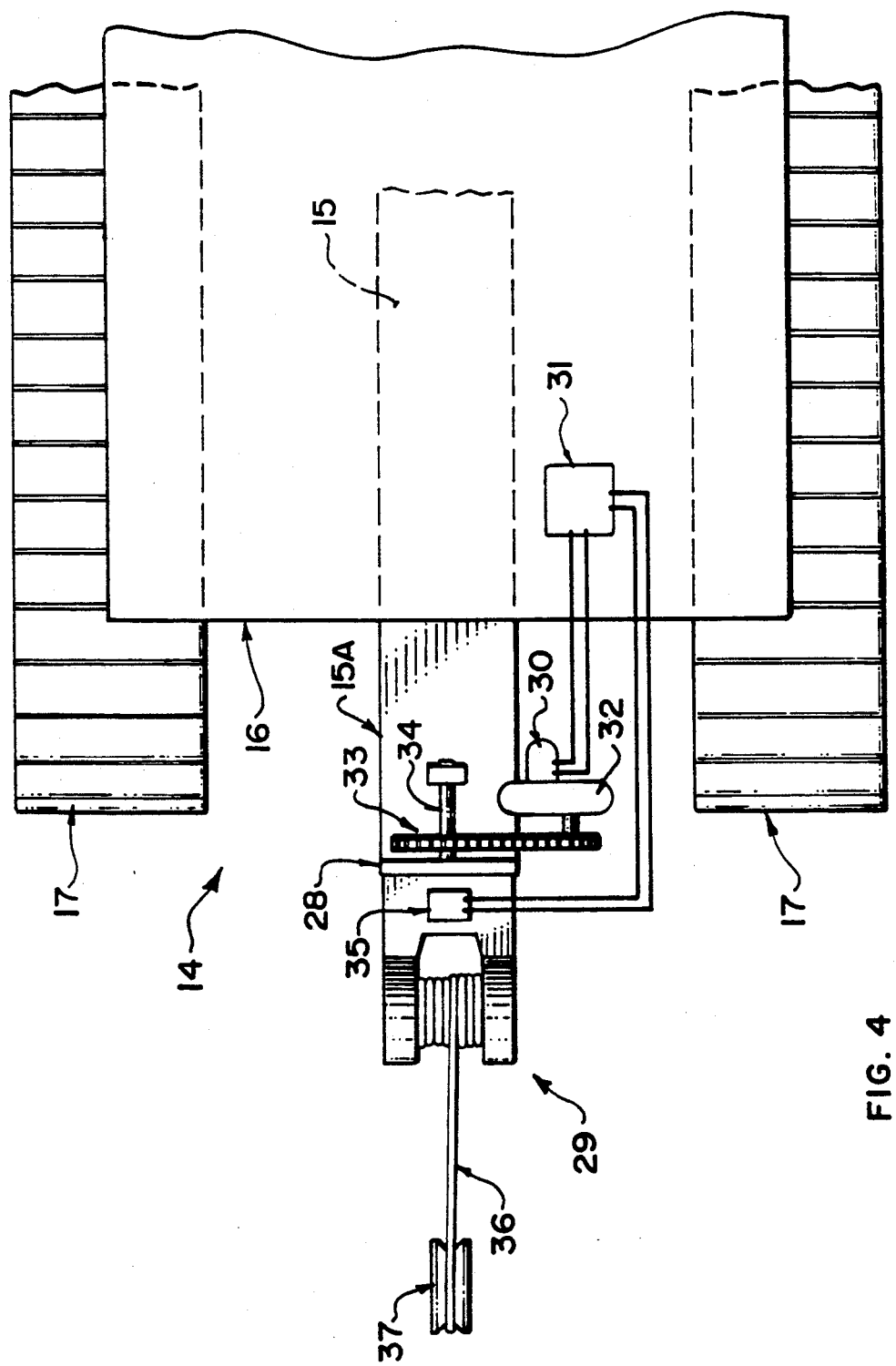
FIG. 4 is a schematic view along the lines 4—4 of FIG. 1.

The system for removing the pipe includes a vehicle generally indicated at 14 shown schematically in FIGS. 1 and 4. The vehicle includes a main longitudinal frame 15, a cab and drive section 16 and driven tracks 17 on which the vehicle can move relative to the ground. Vehicles of this type are of course well known and are often used for heavy excavation work. Such a vehicle generally includes a lift arm 18 pivotally mounted on the top of the vehicle for movement about a horizontal axis under control of a hydraulic lift system schematically indicated at 19.

At the outer end of the lift arm 18 is mounted a vertical arm section 20 which is pivotal about a horizontal pivot pin 21 under control of a hydraulic actuating cylinder 22. Mounted on the lower end of the vertical portion 20 is a horizontal lower portion generally indicated at 23 formed of a lower beam 24 and an upper beam 25. The lower beam 24 is connected to the portion 20 just above the lowermost end thereof and the beam 25 is mounted thereon the position above the beam 24. The beams are connected by a vertical strut 26. One or both of the beams is connected to the portion 20 by a pair of coupling pins 26 so as to prevent pivotal movement of the beams relative to the portion 20 and to hold the beams in a position generally at right angles to the portion 20.

As shown in FIG. 2 each of the beams 24 and 25 is tubular so as to provide very high resistance to compression in the longitudinal direction of the beam.

The main longitudinal frame element 15 of the vehicle projects forwardly to a front end 15A beyond the front edge of the cab 16. On the front end is welded a transverse vertical flange 28 which provides a support for a winch assembly 29 of very large force capacity. The winch 29 is driven by a hydraulic motor 30 receiving power from a pump schematically indicated at 31 driven by the engine of the vehicle. The motor 30 drives a step down box 32 which in turn drives a sprocket and chain drive system 33 providing input drive to a main shaft 34 of the winch. A clutch 35 is operated hydraulically by control lines from the vehicle control system (not shown). The winch carries the cable 36 which can thus be reeled in or released by operation of the winch in a direction controlled by the hydraulic motor 30. The cable 36 passes over a first pulley 37 and a second pulley 38. The first pulley is mounted on the lift arm 18 at the end thereof adjacent the pivot coupling 21 by a support clevis 39. The clevis 39 is again formed of very strong construction so that vertical force on the clevis provided by the vertical portion of the cable can be communicated from the pulley 37 into the arm 18 to accommodate the full force capacity of the winch 29. The pulley 38 is similarly mounted upon a clevis 40 mounted on a rear face of the vertical portion 20 of the boom. The lower portion of the periphery of the pulley 38 is thus positioned just below the lowermost end of the vertical portion 20 so that the cable 36 can extend forwardly from the lower periphery of the pulley 38 in the horizontal direction shown for entering the pipe 10.

A separate H-beam section 42 comprises a pair of vertical angle irons 43 and 44 as best shown in FIG. 2 connected by horizontal struts 45. The spacing of the angle irons 43 and 44 is arranged such that the beams 24 and 25 just enter into the interior and rest against the webs of the angle irons forming the vertical front surface of the H-beam 42. The H-beam can thus be pressed against the front side of the opening 12 to provide a reaction against the soil for forces generated by the horizontal pulling action on the cable 36. The position of the lower horizontal strut 45 is arranged so that the pipe 10 can be accommodated underneath the horizontal strut. Different diameters of pipe can thus be accommodated from small pipe of the order of four or five inches up to large pipes of the order of twenty-four inches diameter.

As particularly shown in FIG. 3, the far end of the cable 36 includes an end block 44 which is integrally connected to the end of the cable so as to enable the communication of force on the cable to various coupling elements. As shown in FIG. 3 the end block is connected to an abutment member 45 including a disc-shaped end plate 46 and a cylindrical insert 47 which projects into the interior of the pipe 10. The disc-shaped end plate 46 includes a slot 48 which is keyhole-shaped so the block 44 can be passed through the wider portion and then moved downwardly into the narrower portion of the slot so that the block is held on the rear face of the end disc 46 to enable force to be communicated to the abutment member 45 and thus to the end of the pipe 10. Various shapes and designs of abutment member 45 can be provided to accommodate different designs and sizes of pipe 10.

The abutment member further includes a ring 49 on the rear face for connection to a chain 50 by which the abutment member can be used to trail further equipment as explained hereinafter.

In FIG. 1, the abutment 45 is trailed by a plug 51 including a front coupling ring 52 followed by a conical surface 53 and a cylindrical surface 54. The cylindrical surface 54 has a diameter slightly greater than that of the pipe 10 so that when pulled through the opening behind the pipe as it is removed, the plug member acts to clean the opening by compressing the soil around the area of the removed pipe so that further pipe sections can be simply inserted into the bore thus formed.

In FIG. 3, the chain 50 is connected to a front guide element 55 which forms a sleeve for receiving the front end of a new pipe section indicated at 56. Again the element 55 includes a conical front surface 57 and a cylindrical surface 58 which act as cleaning elements for the bore and at the same time protect the front end of the pipe 56 so that they can be easily drawn into place. The chain 50 can be connected to the front end of the element 55 in any suitable manner and in one example, the front end can include a slot for receiving one link of the chain 50. The chain 50 can then be threaded through the pipe section 56 to a further abutment member 59 at the rear end of the pipe section 56 to which the chain 50 is releasably attached again for example using the slot coupling which enagages one link of the chain 50. In this way the abutment member 59 can be released from the chain and attached to the rear end of a further section after the further section is threaded onto the chain 50. In this way a plurality of sections can be pulled into the bore formed by the removal of the existing pipe with each section in turn being threaded onto the chain as the previous section is pulled into the bore hole.

In FIG. 1 is shown in addition to the pulling action of the cable 36 on the abutment member 45 an additional force generated by a cylinder 60 mounted in the opening 13. It has been determined that the force to initially move the existing underground pipe from its rest position through the first few inches or few feet of movement is significantly greater than the remaining force once the initial movement has taken place. It will be appreciated that the bonding which occurs between the soil and the outside of the pipe or any openings or indentations on the outside of the pipe is significantly greater than the friction between the soil and the pipe once the bonding has been broken. For this purpose therefore the ram is also included to provide an additional force during the first few inches or feet of movement that is the first movement of the pipe from the slightly exposed position at the front of the opening 12 to a position where the pipe reaches the rear end of the lower portion 23 of the boom. Once the initial movement is complete, the ram 60 can be removed.

Figure 5:
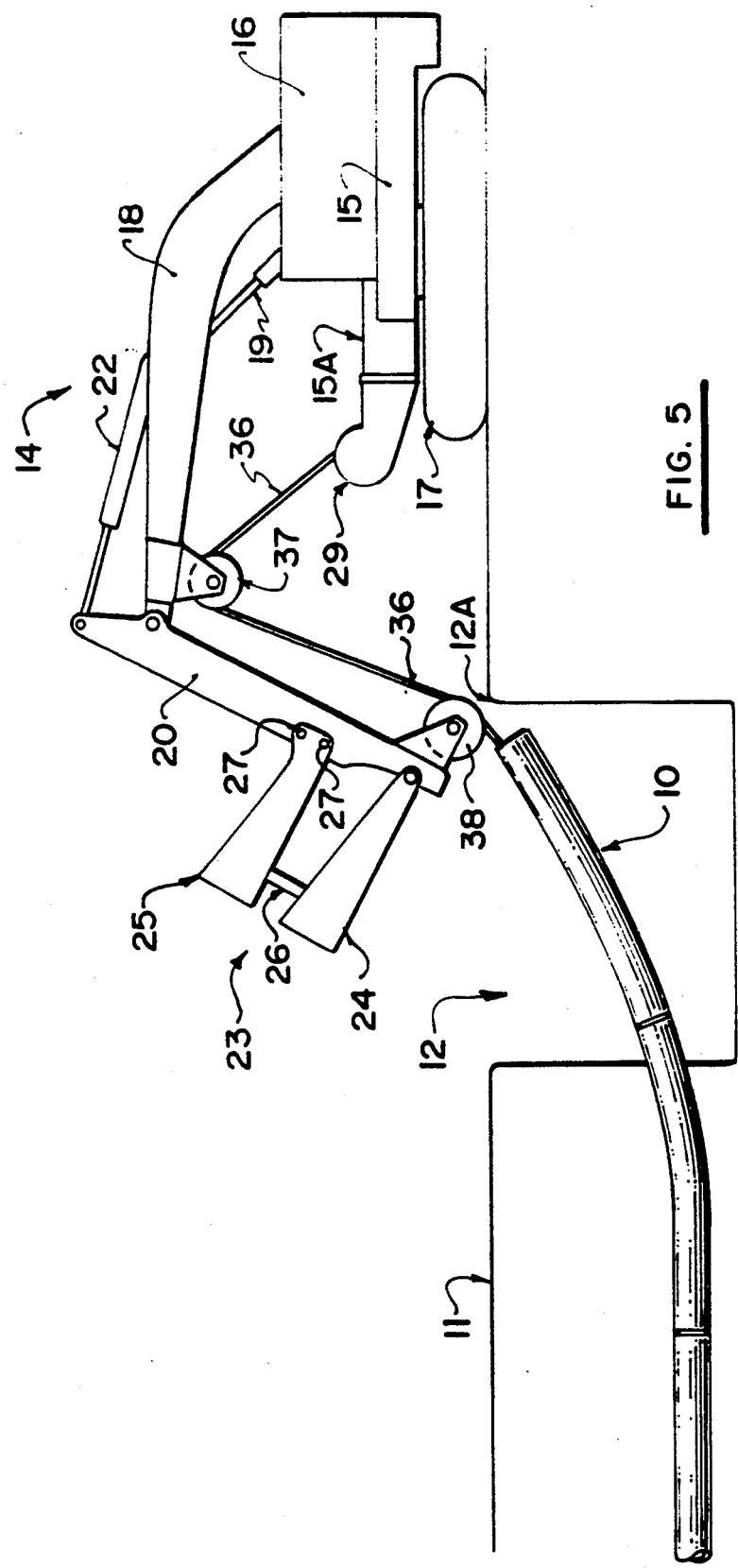
FIG. 5 is a view similar to that of FIG. 1 showing a further step in the process.

As shown in FIG. 5, once the initial movement of the pipe is complete so that it is moved a few feet from the initial rest position to a position adjacent the pulley 38, the boom can be lifted from the opening 12 by raising the lift arm 18 so the end of the pipe is pulled upwardly to just clear the upper rear edge indicated at 12A of the opening 12. From this position the pipe and the cable 36 can be pulled from the opening simply by moving the cable and the pipe in a direction away from the opening by attachment to a suitable vehicle. In cases where it is unsuitable for the heavy track vehicle 14 to move away from the opening, the cable can be attached to a separate vehicle on tires which pulls the pipe and the cable longitudinally away from the opening to pull the pipe out of the ground. In other cases the vehicle 14 may simply move rearwardly away from the opening to pull the pipe fully from the ground.

The initial connection of the cable to the abutment member can be carried out by threading through the pipe portion in the underground location a stiff feeder wire which is then attached to a thin feeder cable which pulls the heavy cable 36 through the pipe from the winch to the second opening. The heavy cable 36 may have a diameter of the order of 1.5 inches to accommodate the very larges forces involved. The winch can have a horsepower capacity of the order of 900 hp. generated by the step-down gear system from the hydraulic motor 30.

As shown in FIG. 5, the pipe portion is formed in short pipe sections of the order of ten feet in length coupled by various techniques depending on the pipe concerned. The whole of the pipe portion in its complete sections can therefore be pulled out of the underground location in one action.

Where the size or location of the pipe prevents it from being drawn out of the opening in the manner shown in FIG. 5, the separate pipe sections can be broken within the opening 12 and removed manually. For this purpose a blade 61 is mounted on the front edge of the vertical portion 20 of the boom so as to project forwardly just above the cable 36. The end face of the pipe section drawn by the cable thus comes into contact with the blade 61 so the pipe section is then fractured in longitudinal direction breaking it into pieces which can be simply manually removed from the opening.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method for extracting underground pipe comprising excavating a first and a second opening in the ground to expose a first and a second end of a portion of the pipe, passing a cable through the pipe from the first end to the second end, attaching an abutment member to the cable at the second end so as to engage the second end of the pipe portion, winding the cable onto a winch mounted at the first opening, guiding the cable at the first opening so as to apply a longitudinal pulling force on the pipe portion to pull the pipe portion into the first opening and engaging a side of the opening adjacent the first end to apply a reaction forces from the pulling force to the ground surrounding the pipe wherein the winch is mounted on a vehicle at a position outside the opening and the cable is guided by pulleys from the vehicle into the opening, wherein the pipe is pulled through an initial movement by winding said cable onto the winch while said reaction forces are applied to the ground surrounding the pipe, and wherein the pipe is pulled through a subsequent movement by halting the winding of the cable onto the winch and moving the vehicle away from the opening.

2. The invention according to claim 1 wherein the pipe is formed in a plurality of separate sections and wherein the portion includes more than one section.

3. The invention according to claim 1 including attaching a plug member behind the abutment member, the plug member having a diameter greater than that of the pipe so as to clean the hole as the pipe is removed.

4. The invention according to claim 3 including attaching a new pipe behind the plug member such that the new pipe is pulled into the hole as the old pipe is withdrawn.

5. The invention according to claim 4 wherein the new pipe is formed in sections and wherein an abutment member is placed behind each new section in turn as the new pipe section is drawn into place.

6. The invention according to claim 1 including providing a hydraulic ram at the second end of the pipe portion and actuating the ram to provide an additional pushing force against the second end of the pipe portion during at least a first portion of the movement of the pipe portion.

7. The invention according to claim 1 including breaking the pipe by pulling an end face of the pipe against a fixed blade.

8. Apparatus for extracting underground pipe at an excavated hole in the ground at an end of the pipe, the excavated hole having a vertical planar end face through which the pipe projects, the apparatus comprising a vehicle having ground engaging means for movement of the vehicle across the ground, a winch mounted on the vehicle for winding and releasing a cable having a free end remote from the winch, abutment means on the remote end of the cable for engaging a remote end of the pipe to apply a pulling force thereto, an abutment frame structure for mounting in the excavated hole and defining a front substantially planar surface for engaging the end face of the hole, first pulley means arranged to direct the cable from the winch to turn downwardly into the hole, second pulley means, frame means mounting the second pulley means arranged at a position spaced from the abutment frame structure so as to direct the cable from the first pulley means in a direction substantially at right angles to the front surface of the abutment frame structure, means interconnecting the frame means and the abutment frame structure to transmit reaction forces therebetween in response to the pulling force on the cable and means for interconnecting the frame means and the vehicle to communicate said reaction forces therebetween, wherein said means interconnecting the frame means and the vehicle comprises a boom connected to the vehicle and pivotal relative thereto and wherein the winch is mounted upon a longitudinal frame of the vehicle at a position underneath the boom.

9. The apparatus according to claim 8 wherein the frame means comprises a substantially vertical beam, wherein the abutment frame structure comprises a pair of vertical members each for positioning on a respective side of the pipe and at least one transverse member connecting the vertical members, the vertical members and the at least one transverse member lying in said substantially planar surface and a plurality of separate connecting members extending from said abutment frame structure to said vertical beam at vertically spaced positions thereon, the first pulley being mounted at a top of the substantially vertical beam and the second pulley means being arranged at a bottom of the substantially vertical beam.

10. The apparatus according to claim 9 wherein the winch comprises a winch drum, a hydraulic drive motor for generating primary force for driving the winch drum and a mechanical transmission system providing a gear reduction for communicating drive from the hydraulic motor to the winch drum.

11. Apparatus for extracting underground pipe at an excavated hole in the ground at an end of the pipe, the excavated hole having a vertical planar end face through which the pipe projects, the apparatus comprising a vehicle having ground engaging means for movement of the vehicle across the ground, a winch mounted on the vehicle for winding and releasing a cable having a free end remote from the winch, abutment means on the remote end of the cable for engaging a remote end of the pipe to apply a pulling force thereto, an abutment frame structure for mounting in the excavated hole and defining a front substantially planar surface for engaging the end face of the hole, first pulley means arranged to direct the cable from the winch to turn downwardly into the hole, second pulley means, frame means mounting the second pulley means arranged at a position spaced from the abutment frame structure so as to direct the cable from the first pulley means in a direction substantially at right angles to the front surface of the abutment frame structure, means interconnecting the frame means and the abutment frame structure to transmit reaction forces therebetween in response to the pulling force on the cable and means for interconnecting the frame means and the vehicle to communicate said reaction forces therebetween, wherein the winch is mounted on the vehicle separate from the frame means and the abutment frame structure, wherein the frame means comprises a substantially vertical beam, wherein the abutment frame structure comprises a pair of vertical members each for positioning on a respective side of the pipe and at least one transverse member connecting the vertical members, the vertical members and the at least one transverse member lying in said substantially planar surface and a plurality of separate connecting members extending from said abutment frame structure to said vertical beam at vertically spaced positions thereon, the first pulley being mounted at a top of the substantially vertical beam and the second pulley means being arranged at a bottom of the substantially vertical beam.

12. The apparatus according to claim 11 wherein the winch comprises a winch drum, a hydraulic drive motor for generating primary force for driving the winch drum and a mechanical transmission system providing a gear reduction for communicating drive from the hydraulic motor to the winch drum.

* * * * *